United States Patent [19]
Buecker, deceased

[11] 3,758,751
[45] Sept. 11, 1973

[54] PRESET FREQUENCY SELECTION SYSTEM

[75] Inventor: Carl Henry Buecker, deceased, late of Fort Wayne, Ind. by Majorie J. Buecker, executrix

[73] Assignee: Magnavox Company, Fort Wayne, Ind.

[22] Filed: Oct. 6, 1971

[21] Appl. No.: 186,892

[52] U.S. Cl. .......... 235/61.11 E, 340/339, 334/89, 250/219 DC

[51] Int. Cl. ...... G06k 7/10, E04g 17/00, H03j 5/00

[58] Field of Search .............. 235/61.11 A, 61.11 B, 235/61.11 C, 61.11 E; 340/339; 334/89; 200/46; 250/219 DC

[56] References Cited

UNITED STATES PATENTS

| | | | |
|---|---|---|---|
| 3,581,019 | 5/1971 | Ryan | 179/90 CS |
| 3,592,973 | 7/1971 | Gray | 179/90 CS |
| 1,769,022 | 7/1930 | Goerlitz | 235/61.11 B |
| 3,335,265 | 8/1967 | Apfelbaum et al. | 235/61.11 E |
| 2,881,976 | 4/1959 | Greanias | 235/61.11 E |
| 2,967,664 | 1/1961 | Ress | 235/61.11 E |
| 2,938,666 | 5/1960 | Rand | 235/61.11 E |
| 2,861,220 | 11/1958 | Obolensky | 340/339 |

*Primary Examiner*—Daryl W. Cook
*Attorney*—Richard T. Seeger

[57] ABSTRACT

A system for prescribing one of a plurality of possible operating conditions for a radio device is disclosed wherein a punched card containing coded information identifying selected ones of the plurality is optically read in a static manner and the thus read information utilized to energize a visual readout identifying which of the several possible operating conditions has been defined by the specific information read from the card and the thus read information is also used to cause the system to operate under the prescribed operating condition. In the embodiment described, the condition is the frequency at which a transmitter and/or receiver is to operate.

16 Claims, 7 Drawing Figures

PATENTED SEP 11 1973

3,758,751

SHEET 3 OF 4

PRESET FREQUENCY SELECTION SYSTEM

BACKGROUND OF THE INVENTION

This invention relates to a method and apparatus for expediently specifying one of a number of possible operating conditions for an electrical device and more especially to specifying one of a number of possible operating frequencies for a radio transmitter and/or receiver. Prior art schemes for specifying the frequency at which a transceiver is to operate range from a simple electrical socket into which a selected crystal is inserted, to a series of manually operable switches which connect in turn the appropriate crystal and tuned circuits into the transceiver circuitry, and sophisticated digital type frequency to a switching system which appropriately combines a smaller number of circuits and crystals to "synthesize" the desired operating frequency. Such frequency synthesizers and their use in communication equipment are old in the art and may take on one of several forms such as for example, that disclosed by U.S. Pat. Nos. 2,131,558 and 3,054,057. All of these prior art systems require considerable time for the operator of the equipment to specify or adjust the equipment to the desired operating frequency and in many situations such as for example, in aircraft communication equipment where it is desired to rapidly change from one frequency to another, this time consuming adjustment or operation of these frequency selection switches is highly undesirable. Thus, prior art equipments, especially commercial and military airborne radio equipments, generally utilize a system whereby, in addition to the normal frequency selection controls, a number of desired operating frequencies are preselected from the equipment's total frequency range capability and these preset and preadjusted frequency channels selected by means of a single operating control. In such prior art equipments, however, in order to establish and adjust the equipment to these desired frequencies involves at the least, internal adjustments of a mechanical and/or electrical nature which most generally required some technical skill and equipment and the adjustment procedure is not at all well adapted to be performed with the equipment installed in its operating environment.

SUMMARY OF THE PRESENT INVENTION

The present invention overcomes the foregoing noted defects by providing an optically readable card on which digital data is encoded specifying the frequencies which will most probably be used in a given situation. A card reader statically reads the digital data identifying any one of these preselected frequencies and this digital data is used not only to energize a visual readout system but to also energize a frequency synthesizing device which in turn provides the desired frequency characteristics for the radio device. The card is provided with a rack or gear tooth track along one edge which engages with a pinion gear within the card reader. This pinion gear is manually actuated and provided with a detent system so that moving the pinion gear between adjacent detented positions causes the card to move from one frequency defining position to the next.

The vast simplification in frequency selection attainable with the system is easily illustrated. As an example, in a commercial application, suppose that an aircraft is on a New York to Chicago flight with stops at Cleveland and Detroit. The one or more frequencies on which the several airports give instruction to incoming aircraft are punched into the card in adjacent positions and the card inserted into the card reader prior to takeoff from New York. While leaving New York, the pilot would talk with the New York tower over the frequency prescribed by the first column in the card and then need only turn the pinion gear to its next detented position or channel so that the card reader may automatically read the digitial data identifying the Cleveland approach frequency for both frequency synthesis and display purposes. The third column in the card might be another frequency associated with the Cleveland airport or may identify the tower frequency for the next stop. Under normal situations, only the prepunched card would be needed for the given flight, however, other unpunched cards or cards punched with emergency frequencies and the like might also be used and in addition the system still provides the normal frequency selection controls which may be utilized to select frequencies not already identified on the punched card.

Accordingly, it is one object of the present invention to provide a method and apparatus for quickly and easily tuning a radio transceiver to a prescribed and preselected frequency.

It is another object of the present invention to provide a punched card and card reading device which may be used to specify one of a plurality of possible operating states of a controllable electronic device.

It is a further object of the present invention to provide a unique punched card and system for statically reading that card.

A still further object of the present invention is to provide a rapid method and apparatus for specifying one of several possible operating frequencies for communication equipment.

It is a further object of the present invention to provide a rapid method and apparatus for selecting one of several possible predetermined operating frequencies for communication equipment and to enable the setting-up of these predetermined frequencies with a minimum of effort and without adjustments to the equipment or requiring the use of tools.

Yet another object of the present invention is to provide a unique control card for electronic equipment.

These and other objects and advantages of the present invention will appear more clearly from the following detailed disclosure read in conjunction with the accompanying drawing in which:

DESCRIPTION OF THE PREFERRED EMBODIMENT

Figure 4:
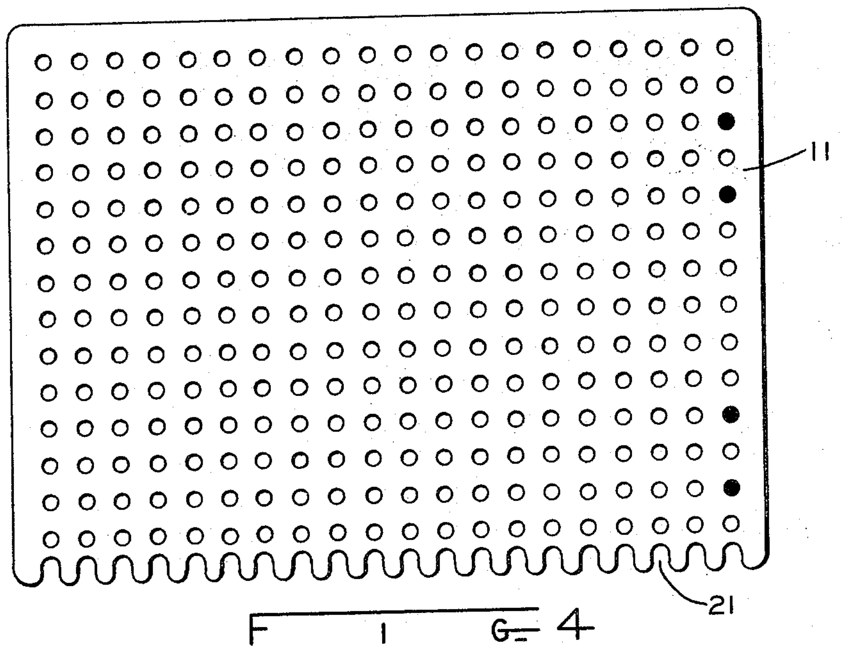
FIG. 4 illustrates the novel punched card having a rack along one edge.

Turning first to FIG. 4, the statically readable card of the present invention is seen to be rectangular with a rack 21 along one edge which in conjunction with a gear in the card reader allows the card to be manually moved a prescribed amount to the left or right as viewed in FIG. 4. The card is seen to have a matrix of perforated or knock out digit locations arranged in 14 rows and 20 columns although in general any n by m matrix of digital information locations could be used. As viewed in FIG. 4, each column constitutes a word location and each word will define a specific operating frequency for the communication equipment. Thus, the card of FIG. 4 allows the operator to quickly select any one of 20 different operating frequencies or channels by merely moving the card left or right to the appropriate position.

The selection of 14 rows (14 bits per word) was found useful in the preferred embodiment of frequency selection for communication equipment and specifically counting from the top downward the first three bit locations are used to encode the first decimal digit, the fourth through seventh bit locations are for the second decimal digit, the eighth through eleventh bit locations are for the third decimal digit and the twelfth and thirteenth bit locations are for the last decimal digit. In this embodiment only 3,4,5,6 and 7 are admissable first digits and the last digit can only be a zero or 5, the bits having a weighted factor of 1, 2, 4 for the first digit and 1, 2, 4, 8 for the second and third significant digit and 0, 5 for the last digit. There is obviously some redundancy in each of these decimal digit positions which could be used for error checking purposes and further the fourteenth or bottom bit position is used as a parity bit and in the preferred embodiment an even number of holes per column was the parity check selected. As a specific example, 42.85 megacycles has been illustrated in the last column of the card of FIG. 4 by darkening the digital information locations which have been removed from the card. These perforated digital information locations are of course selectively removed using a pencil or other pointed instrument. Note that since there are already an even number of bit positions punched out in the last column of the card of FIG. 4, the lower most parity knock out has not been removed, however, had there been an odd number of knock outs already removed, this parity bit position would have also been punched to ultimately provide an even number of holes in an encoded column.

Figure 1:
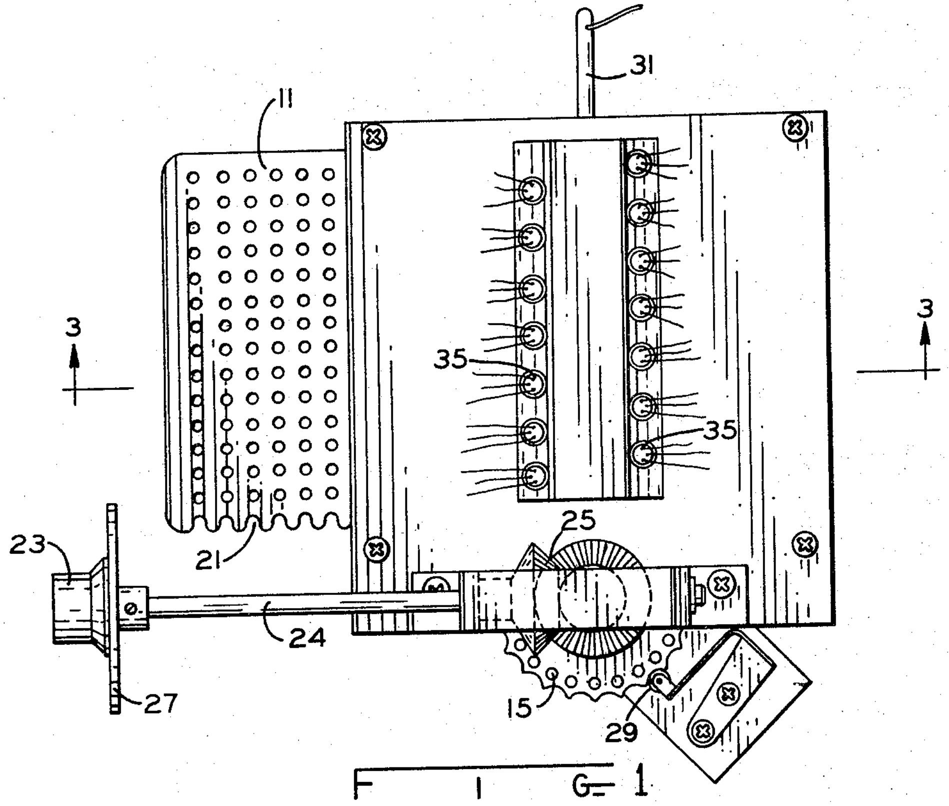
FIG. 1 is a top view of the card reader of the present invention.

Turning now to FIG. 1 which illustrates a top view of the card reader of the present invention, the card 11 is shown inserted in position for reading. The reader comprises a narrow card accepting slot 13 of FIG. 3 and a manually actuable pinion gear having teeth or segments 15 and which as illustrated is a series of rod segments sandwiched between two plates 17 and 19 of FIG. 2. The segments 15 engage the rack 21 for moving the card 11 linearly inward or outward along the slot 13. The pinion gear in turn is manually actuated by an external knob 23 by way of a gear linkage 25. A dial or a mechanical switch 27 may be used in conjunction with the knob 23 to indicate either directly adjacent the knob or on the visual display to be discussed subsequently the specific column of the card which is in proper reading position. The outer plates 17 and 19 of the pinion gear are provided with a series of indentations which mate with a detenting device 29 to define a plurality of discrete rotary positions for the pinion gear. Detenting device 29 also operates a switch 113 of FIG. 6 to reset all of the light sensing devices to their nonconducting state. For any given pitch to the rack 21 the distance between adjacent segments 15 is fairly well defined, however, the distance between adjacent detented positions may be selected so that the card 11 is moved the distance between adjacent columns or word locations when the pinion gear moves from one discrete position to an adjacent discrete position.

Figure 2:
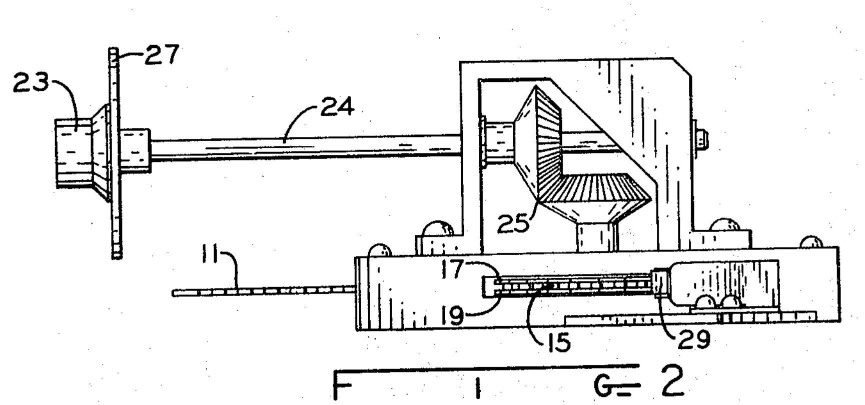
FIG. 2 is an end view of the reader of FIG. 1.
Figure 3:
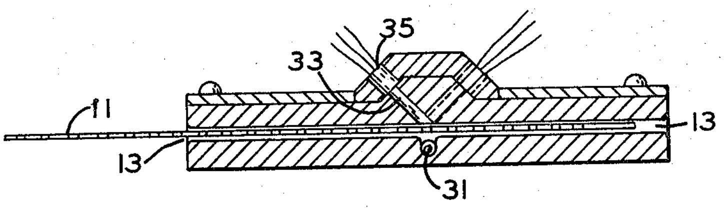
FIG. 3 is a sectional view along the line 3—3 of FIG. 1.

Once the card is in position within the reader the light source 31 which runs the full width of the card will cause light to be transmitted through those digital information locations which have previously been removed, and then passed through a light passageway such as 33 illustrated in FIG. 3 to energize some light sensing device 35. The appropriate light sensing devices will remain energized at least so long as the card remains in a given position. The card reader illustrated in FIGS. 1, 2 and 3 is a static reading device not only because no relative motion between the card 11 and the reader is necessary for readout but further because it is specifically designed to read but a single column from the card for an extended period of time until such time as new data is mechanically selected by actuation of the manually operable means 23.

Figure 5:
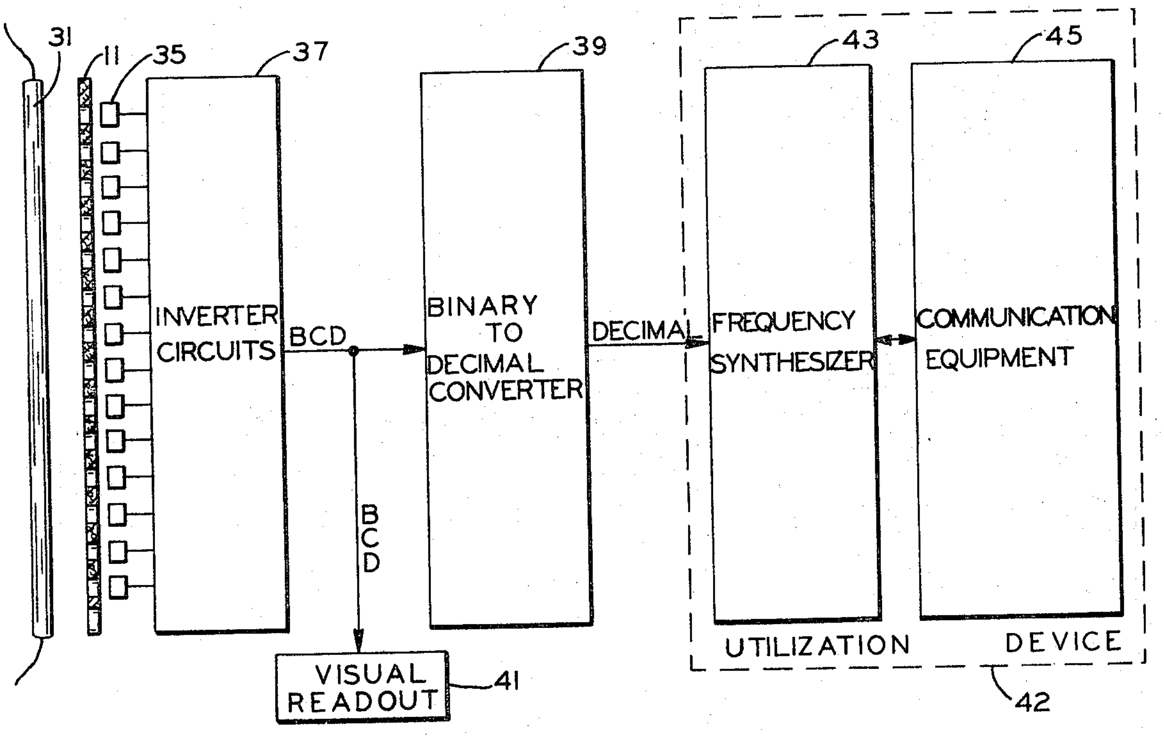
FIG. 5 is a block diagram of the system of the present invention.

The light sensing device 35 of FIG. 3 of course must be repeated for each row of the card and thus the card illustrated in FIG. 4 would require 14 such light sensitive devices. FIG. 5 illustrates these 14 light sensitive devices in block diagram form as being on one side of the card 11 while the light source 31 is found on the opposite side of the card. As mentioned, the light source 31 is an extremely long narrow filament lamp running the complete width of the card although individual sources or one of different configuration may be used.

A series of circuits 37 of FIG. 5 supply digitally encoded data and the complements of each digital position indicative of the holes or lack thereof in the several rows of the specific card column being sensed to a binary to decimal converter 39 and a visual readout means 41. The decimal output from the binary to decimal converter (one out of 10 code) is supplied to a utilization device 42 such as a frequency synthesizer 43 which may for example be constructed in accordance with the principles of the aforementioned U.S. Pat. No. 2,131,558. The frequency synthesizer may of course be utilized in conjunction with some type of communication equipment 45 for defining the operating frequency of that communication equipment.

Figure 6A:
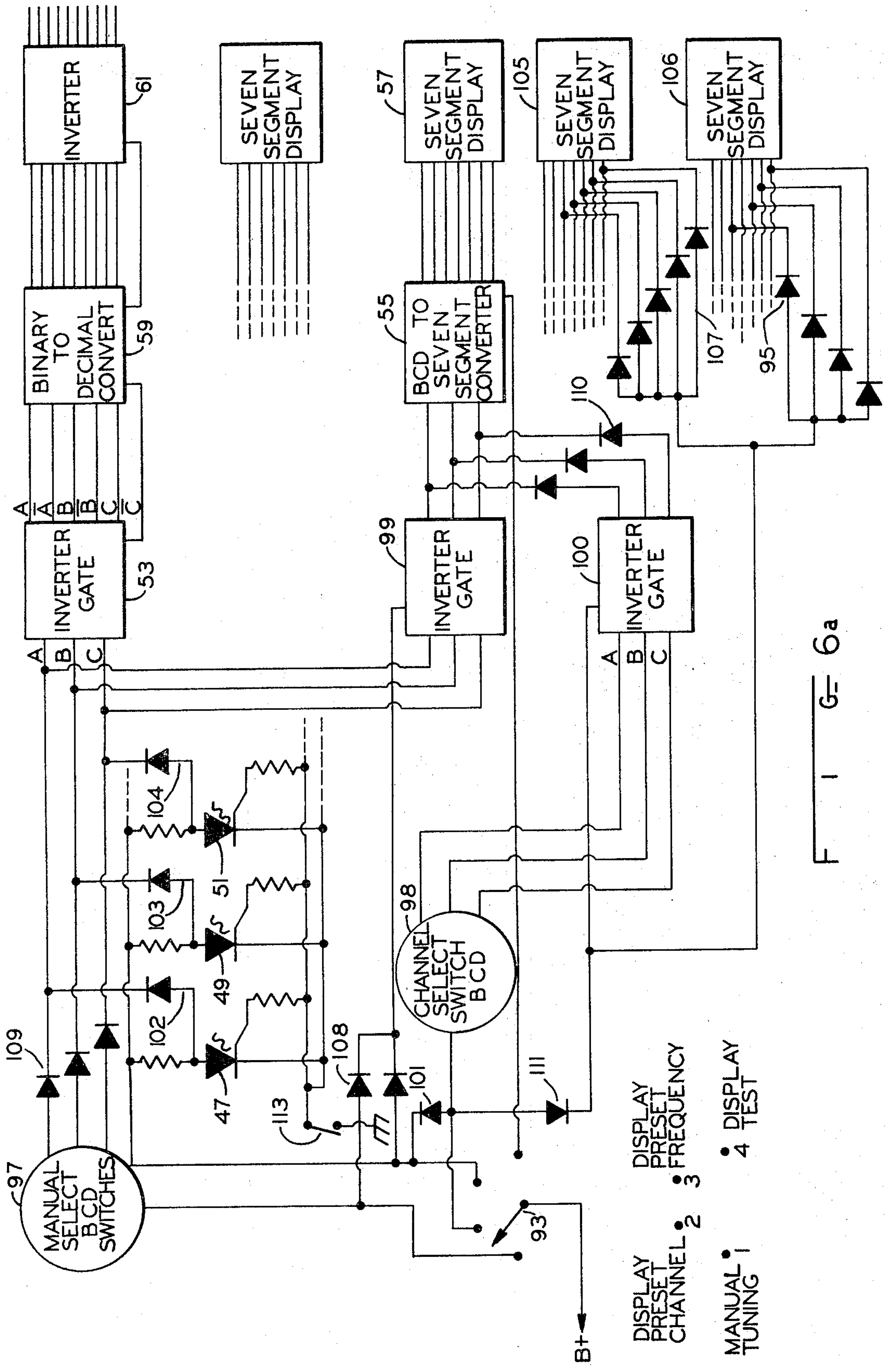
FIGS. 6*a* and 6*b* when joined together show a partial schematic diagram for one preferred embodiment of the present invention.
Figure 6B:
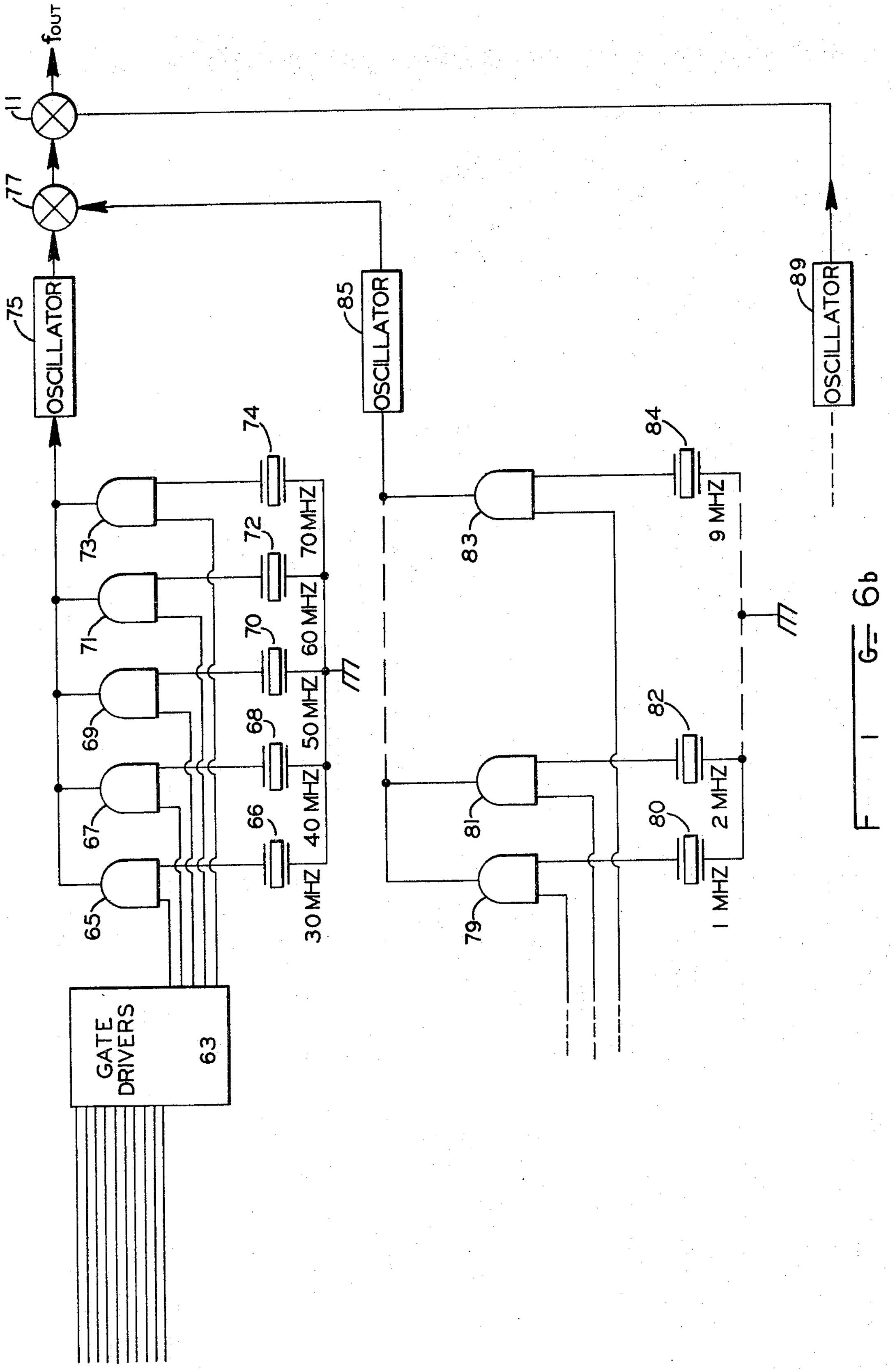

Consider now FIG. 6 which illustrates the details of the present invention for a reduced number of digital information locations. Three light sensitive devices, 47, 49 and 51, are illustrated in this schematic diagram as light sensitive silicon controlled thyristors such as manufactured by UNTRODE CORP., Watertown, Massachusetts as Type PF 30 A and would be the three light sensitive devices for the upper three rows of a card which, as noted earlier, would have admissable values of only 3, 4, 5, 6 and 7. For other positions where any other decimal digit might occur, four light sensitive devices are employed. The outputs from the light sensitive devices pass through an inverter gate 53 where the original data bits and their complements are generated and then to a binary to decimal converter 59. This converter changes the arithmetic format from a binary coded decimal digit to a decimal digit (one out of ten code) which in turn is applied to an inverter 61 and gate driver 63 which will select the appropriate one of the gates 65, 67, 69, 71 and 73. These gates, 65 through 73, may be relays or any other type of gate structure which when energized will serve to connect one of the five crystals appropriately into the oscillator 75 so as to provide a first signal, of one of five possible frequencies to the mixer 77. The 4th through 7th digital data locations in a given column of the card will be similarly sensed, inverted, converted, amplified and supplied to one of ten gates, only three of which are illustrated as 79, 81 and 83. Again at most one gate will be energized to couple one of the 10 available crystals to the oscillator 85 to provide one of 10 second frequencies to the mixer 77. If, for the example, the mixer output is the sum of its input frequencies it is obvious that 42 megahertz may be synthesized when gates 67 and 81 are energized. Similar circuitry may provide the appropriate connection for a crystal in the kilohertz range to yet another oscillator 89, the output of which would be mixed with the output of mixer 77 to achieve the third significant digit in the frequency being synthesized. This synthesizing process may in theory be extended indefinitely however, in any given situation, other well-known frequency synthesizing schemes may be preferable.

With the mode selector switch 93 in position one, the frequency of operation may be selected manually by means of a manually operated binary coded decimal switches 97. The selected data bits are transferred through steering diodes 109 to the inverter gates 53 and 99. The output of inverter gate 99 is applied to a binary coded decimal to seven segment converter 55 and thence to a seven segment display 57. In this manner the significant digit of the selected frequency is displayed for observation. When the mode selector switch is placed in the second position a preset channel is selected. The significant frequency digit is selected by the light sensitive devices previously mentioned and the preset channel selected, is identified by means of a channel select switch 98 having a binary coded decimal format. The three significant data bits are applied to an inverter gate 100 whose outputs are coupled by means of steering diodes 110 to the input of the binary coded decimal to seven segment converter 55 previously used to display a selected frequency digit. In order to further identify a selected mode seven segment display 105 and 106 are reconnected by means of steering diodes 107 and 95 so as to form the letters C and H. In this way the first two display units indicate preset channels and the third and fourth seven segment display units indicate the significant digits of the selected channel number. In the third position of the mode switch 93, the actual preset frequency is displayed. This is accomplished by disabling the channel select inverter gates and steering diodes and reconnecting the inverter gates 99 to the frequency select lines. Steering diodes 101 and 111 and 108 provide proper operating switching potentials to appropriate gates and diode matrices in order to accomplish the desired functions. The fourth position supplies a control voltage to a special terminal of the binary coded decimal to seven segment converter to cause all the segments of the display units to become illuminated. This will establish the validity of the displayed digit.

As noted earlier, a dial 27 may provide a visual indication of which card column or preset frequency channel is being sensed by the reader or this visual dial indication may be replaced or supplemented by a visual indication on the electro-optical display element 41. An electrical switch 98 is mechanically driven by the card reader shaft 24 and is provided with appropriate connections to the several seven segment display devices so that the channel number or card position in use is indicated. For a 20 column card, this display would of course indicate CH1 through CH20. The function switch 93 depending upon its position, will allow the display 41 to indicate either the aforementioned channel number or the exact preset channel frequency in for example, MHz. The functions provided by switch 93 are as indicated in FIG. 6*a*. With the switch 93 in position number 2, the appropriate four lines of the seven segment display unit 106 are grounded by way of four diodes 95 to provide the letter C in the first digit display position. In the second digit display position 105, five lines are similarly grounded by way of diodes 107 to provide the letter H and two further stages are selectively grounded through diodes in accordance with the specific position of the switch 98 to provide the actual column or channel number.

Position 1 for the switch 93 allows manual operation of the present device by way of manual binary coded decimal switches 97 of which there will be one for each significant digit employed. This binary coded decimal digit 97 provides the same connection which would be provided by optical energization of the appropriate ones of the several light sensitive silicon controlled rectifiers 47, 49 and 51. Thus, when the switch 93 is in position 1 the several manual binary coded decimal switches 97 allow the present invention to be operated much as the aforementioned U.S. Pat. No. 2,131,558.

Position 3 for switch 93 allows the display of the actual information encoded in the card column being sensed and position 4 is a display lamp test position which may be ignored for the purposes of the present discussion.

The method of using the present invention to quickly and easily specify one of a number of possible operating states of a machine should now be clear. A blank relatively opaque preperforated card having an *n* by *m* matrix of easily removable segments is taken and selected ones of those segments are manually removed for example using a pencil or other pointed instrument so as to encode into specific columns of the card binary coded information indicative of a few of the most commonly used operating states. The card is then inserted into the reader and manually moved so that a desired column is in reading position within the reader. The reader of course provides a digital signal output indicative of one of the possible operating states (for example operating frequencies for a radio device) and these digital signals are in turn used to synthesize resonant circuitry by selectively combining a plurality of resonant circuit elements or other frequency determining elements. The digital signals of course may also be used to provide a visual display indicative of the particular operating state at which the machine is operating.

Thus, while the present invention has been described with respect to a specific embodiment, numerous modifications will suggest themselves to one of ordinary skill in the art. For example, the card and reader of the present invention could be utilized in conjunction with the appropriate switching circuitry to select the "code of the day" for a speech scrambler or other security communication link. Similar modifications will readily suggest themselves to those of ordinary skill in the art, and accordingly the scope of the present invention is to be measured only by that of the appended claims.

I claim:

1. A storage medium and reading device comprising:
- a storage card having a plurality of digital information locations thereon, said digital information locations being arranged to form at least *m* distinct word locations with the binary digit locations arranged in *n* rows and *m* columns;
- means for statically sensing one of said word locations and providing electrical signals indicative of the digital information stored therein; and
- means including a gear tooth track along one edge of the card for selectively moving one of said storage medium and said static sensing means relative to the other to thereby present a new word location to said static sensing means.

2. The reading device of claim 1 wherein said selective moving means comprises:
- a pinion gear disposed at least partially within said reading device and adapted to mesh with said gear tooth track; and
- manually operable means coupled to said pinion gear and adapted to selectively impart rotary motion to said pinion gear and linear motion to said card.

3. The reading device of claim 2 further comprising detent means associated with said pinion gear and adapted to define a plurality of discrete rotary positions of said pinion gear.

4. The reading device of claim 3 wherein said columns are uniformly distributed and movement of said pinion gear between two adjacent discrete positions corresponds to linear movement of said card a distance equal to the distance between adjacent columns.

5. The reading device of claim 1 wherein said binary digit locations each comprise a small area of said card at least partially surrounded by perforations, said perforations allowing said small area to be removed from said card to thereby change the binary digit represented by the said area.

6. The reading device of claim 1 wherein said binary digit locations each comprise a small area on said card an optical property of which defines the particular binary digit stored in that location further comprising:
- at least one light source adapted to illuminate one word location; and
- *n* transducers for converting light energy into electrical energy, one said transducer being associated with each said binary digit in said illuminated one word location and being responsive to the effect of said light source on said binary digit location to provide a first electrical output in response to the presence of a first type of binary digit and a second electrical output in response to the presence of a second type of binary digit.

7. The reading device of claim 6 wherein said optical property is the opacity of said small area, said light source being positioned on a side of said card opposite from said n transducers.

8. A device for selecting one of k possible operating frequencies for a radio device comprising:
- a selectively prepunched card having binary information digit locations arranged thereon in n rows and m columns, the m columns identifying *m* frequencies where $m < k$;
- a card reader for statically reading binary information indicative of one of said m frequencies from said card and providing an output indicative thereof;
- means for utilizing said output to identify the thus selected frequency;
- a rack integral with and lying along one edge of said card generally parallel to said *n* rows;
- a pinion gear disposed at least partially within said reader and adapted to mesh with said card rack; and
- manually operable means coupled to said pinion gear and adapted to selectively impart rotary motion to said pinion gear and linear motion to said card.

9. The device of claim 8 further comprising detent means associated with said pinion gear and adapted to define a plurality of discrete rotary positions of said pinion gear.

10. The device of claim 9 wherein said columns are uniformly distributed and movement of said pinion gear between two adjacent discrete positions corresponds to linear movement of said card a distance equal to the distance between adjacent columns.

11. The device of claim 8 wherein $2^n - 1 \geq k$ thereby providing the possibility of error checking capabilities within said device.

12. A device for selecting one of *k* possible operating frequencies for a radio device comprising:
- a selectively prepunched card having binary information thereon identifying at least one of the *k* frequencies;
- a card reader for statically reading binary information indicative of one of said *k* possible frequencies from said card and providing an output indicative thereof;
- at least one display device responsive to said indicative output to thereby provide a visible indication of the thus selected frequency; and
- means responsive to said indicative output for causing said ratio device to operate at the one of said *k* frequencies indicated.

13. A device for selecting one of *k* possible operating frequencies for a radio device comprising:
- a selectively prepunched card having binary information thereon identifying m frequencies where $m < k$;
- a card reader for statically reading binary information indicative of one of said m frequencies from said card and providing an output indicative thereof;
- a plurality of decimal digit display devices responsive to said indicative output to thereby provide a visible indication of the thus selected frequency; and
- a frequency synthesizing device responsive to said indicative output for providing one of *k* frequencies corresponding to said *k* possible operating frequencies of the device.

14. The method of prescribing one of *k* possible operating frequencies for a radio device comprising:
- perforating a relatively opaque card so as to provide an *n* by *m* matrix of removable segments;
- manually removing selected ones of said segments;
- inserting said card into an optical card reading device;

manually moving said card to a position within said optical card reading device at which n of said removable segments forming one column of the matrix may be statically sensed by said optical card reading device to determine which of said $n$ removable segments have been removed, $k$ being greater than $n$, $k$ being greater than $m$, and $2^n$ being greater than $k$; and providing a digital signal output from said optical card reading device indicative of the one of said $k$ operating states defined by the status of the segments in the column being sensed.

15. The method of claim 14 further comprising the step of synthesizing resonant circuitry by selectively combining in response to said digital signal output a plurality of resonant circuit elements.

16. The method of claim 14 further comprising the step of providing a visible display indicative of the states of the several removable segments sensed by said optical card reading device.

* * * * *